United States Patent [19]
Devenyi

[11] Patent Number: 5,732,597
[45] Date of Patent: Mar. 31, 1998

[54] PRE-LOADED SELF-ALIGNING ROLLER NUT ASSEMBLY FOR STANDARD MICROMETER SPINDLE AND THE LIKE

[75] Inventor: Gabor Devenyi, Penetang, Canada

[73] Assignee: Hughes Electronics, Los Angeles, Calif.

[21] Appl. No.: 618,501

[22] Filed: Mar. 19, 1996

[51] Int. Cl.$^6$ ................................................. F16H 25/22
[52] U.S. Cl. ........................... 74/459; 74/424.8 R; 74/441
[58] Field of Search ........................... 74/424.8 R, 459, 74/441

[56] References Cited

U.S. PATENT DOCUMENTS

| | | | |
|---|---|---|---|
| 2,940,322 | 6/1960 | Uhing | 74/459 X |
| 3,614,900 | 10/1971 | Wahlmark | 74/424.8 R |
| 3,698,258 | 10/1972 | Gartner | 74/424.8 R |
| 4,403,522 | 9/1983 | Kumpar | 74/89 |
| 5,533,417 | 7/1996 | Devenyi | 74/459 X |

FOREIGN PATENT DOCUMENTS

| | | | |
|---|---|---|---|
| 3106221 | 10/1982 | Germany | 74/459 |
| 3225496 | 1/1984 | Germany | 74/459 |

Primary Examiner—Allan D. Herrmann
Attorney, Agent, or Firm—Gordon R. Lindeen, III; Michael W. Sales; Wanda K. Denson-Low

[57] ABSTRACT

A linear displacement device (1) is provided with a lead screw (24) having a helical threaded portion (70) and a roller nut assembly (10). The roller nut assembly (10) includes a housing (50) having openings (52, 54) for receiving the lead screw (24) therethrough. A pair of bearings (56, 58) are supported within said housing (50). The bearings (56, 58) each have an inner race (60), an outer race (62) and a plurality of balls (64) disposed between the inner and outer races (60, 62). A spring (94) is disposed between the pair of bearings (56, 58), for biasing the bearings (56, 58) apart. The bearings (56, 58) are provided with a flank engaging portion (66) for engaging the flank (68, 72) of a helical threaded portion (70) of the lead screw (24) and a crest contacting portion (74) for engaging a crest (76) of the helical threaded portion (70) of the lead screw (24).

18 Claims, 3 Drawing Sheets

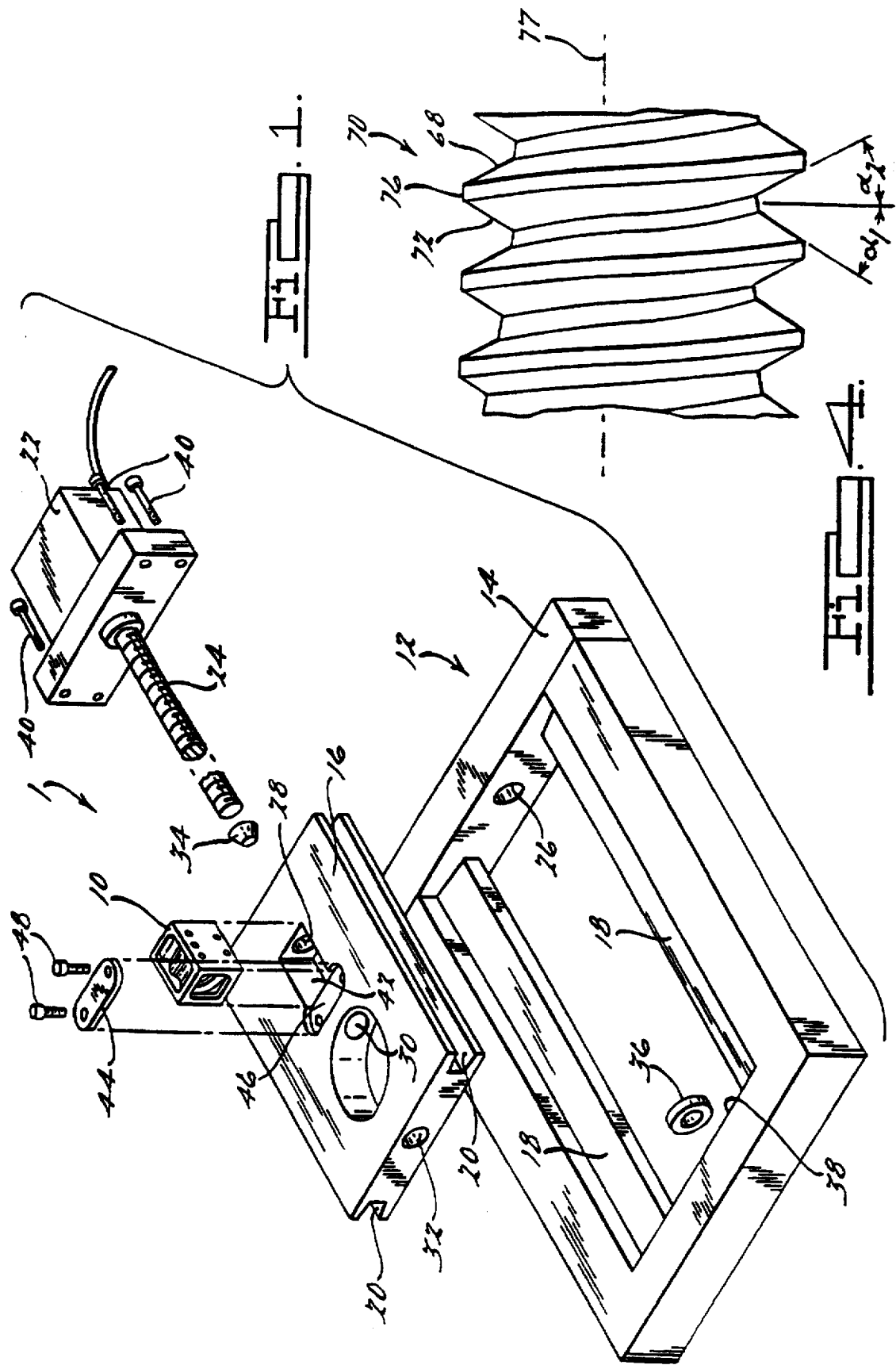

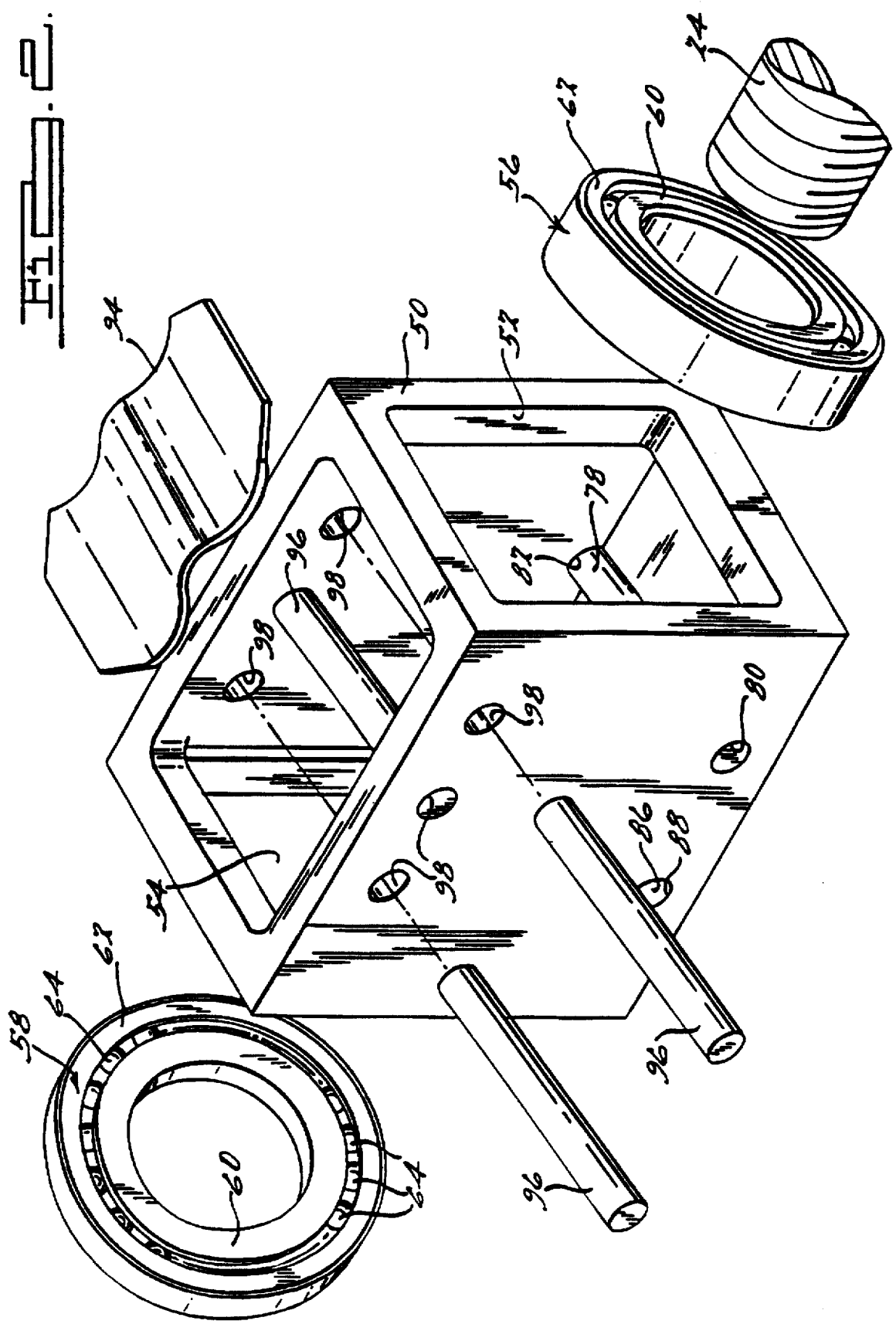

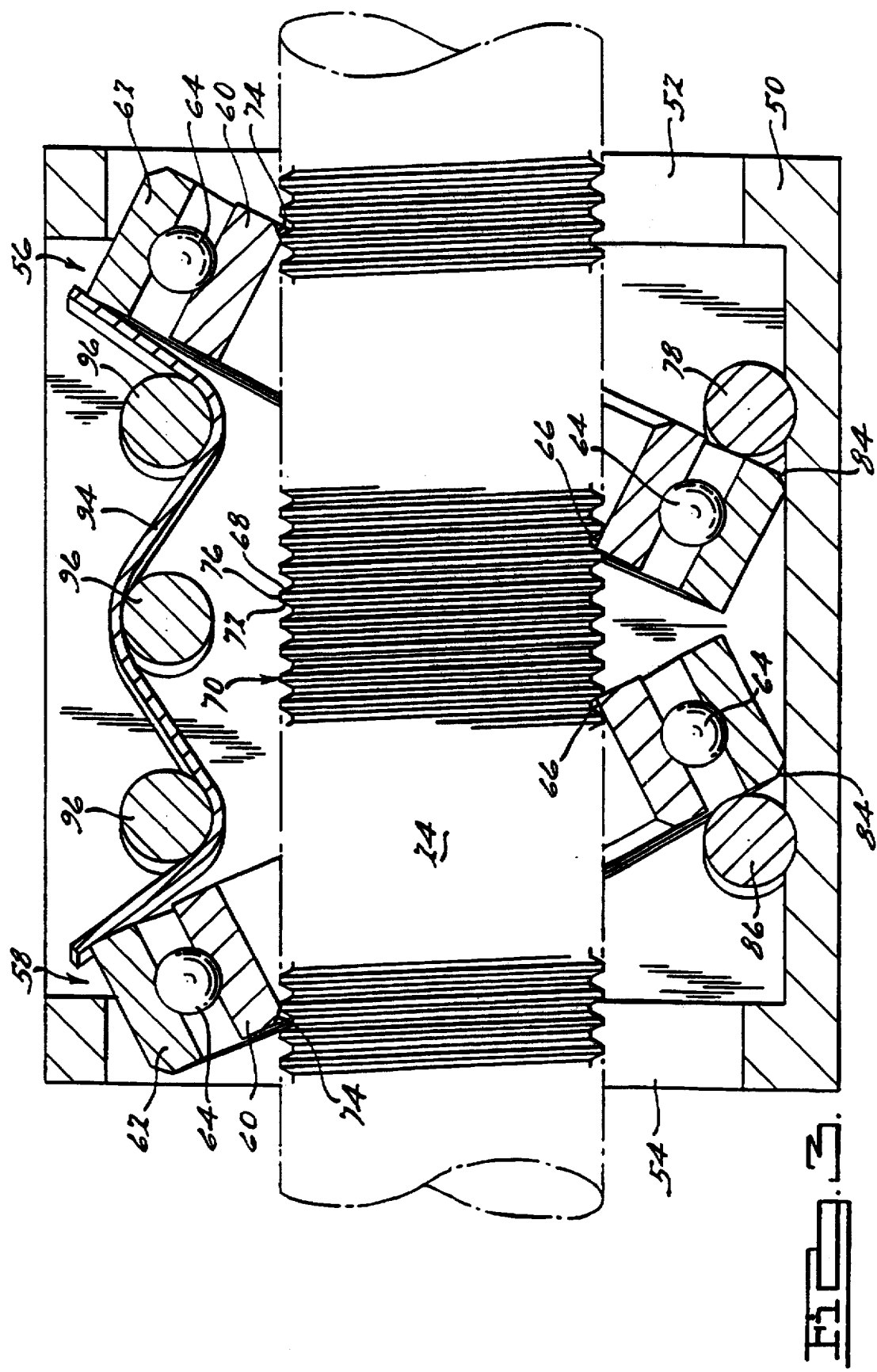

PRE-LOADED SELF-ALIGNING ROLLER NUT ASSEMBLY FOR STANDARD MICROMETER SPINDLE AND THE LIKE

BACKGROUND OF THE INVENTION

1. Field of the Invention

The present invention relates to a linear displacement device and, more specifically, to a roller nut assembly for use with a lead screw of a linear displacement device.

2. Discussion

Linear displacement devices are generally known in the art. Linear displacement devices are used for the rapid, smooth and precise adjustment of linear mechanisms, such as zoom lenses, micrometers, and stepper motor stages, by automatic screw-turning or nut-turning means.

The standard linear displacement device utilizes a lead screw and a standard nut for converting the rotary motion of the lead screw element to relative linear displacement of the nut. The lead screws are generally driven by a stepper motor which causes the lead screw to rotate in increments which causes a corresponding incremental linear movement of the nut.

For proper operation of the conventional lead screw and nut assembly, the nut must be preloaded and periodically reset to produce a repeatable performance. The preload between the nut and the spindle has to be extremely high in order for the linear displacement device to be play-free. The extremely high preload which is required greatly contributes to the amount of friction between the mating surfaces between the lead screw and nut in the linear displacement device. In a typical linear displacement device, thirty-forty percent of the motor torque is used just to overcome the friction between the static nut and the rotating lead screw.

Additionally, if a linear displacement device is used in a vertical orientation, the lubricant between the lead screw and the standard nut will migrate and leave dry the preloaded mating surfaces of the lead screw and nut, thus increasing friction even further, and contributing to the failure of these units.

Accordingly, it is desirable in the art of linear displacement devices to provide a linear displacement device which greatly decreases the amount of friction between the rotating lead screw and the linear displacing nut.

SUMMARY OF THE INVENTION

It is an object of the present invention to provide a linear displacement device which is simple in structure, inexpensive to manufacture, easy to mass produce, durable in use and compact.

This and other objects of the present invention are achieved by providing a linear displacement device, comprising a lead screw having a helical thread, the helical thread having a leading flank portion, a following flank portion and a crest portion. A roller nut assembly is provided for linear movement relative to the lead screw. The roller nut assembly includes a housing having openings for receiving the lead screw therethrough, a pair of bearings each having an inner race, an outer race and a plurality of balls disposed between said inner and outer races. The bearings are angularly supported within the housing with spring means disposed between the pair of bearings for preloading the bearings. Each of the bearings have a flank engaging portion for engaging one of the flanks of the helical thread of the lead screw and a crest engaging portion for engaging the crest of the helical thread of the lead screw.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only and thus are not limitative of the present invention, and wherein:

FIG. 1 is a perspective view of the components of a stepper motor linear displacement stage which incorporates the roller nut assembly according to the principles of the present invention;

FIG. 2 is an exploded perspective view of the components of the roller nut assembly according to the principles of the present invention;

FIG. 3 is a cross-sectional view of the roller nut assembly according to the principles of the present invention; and FIG. 4 is an enlarged view of a typical lead screw which is utilized with the roller nut assembly of the present invention.

DETAILED DESCRIPTION OF THE PREFERRED EMBODIMENTS

The present invention relates to a linear displacement device 1 utilizing a roller nut assembly 10. The linear displacement device 1 according to an exemplary embodiment, is incorporated into a stepper motor stage 12.

The stepper motor stage 12 includes a base portion 14 and a slide stage 16. The base portion includes a pair of V-shaped side members 18 which mate with corresponding V-shaped grooves 20 disposed on opposite sides of slide stage 16.

A stepper motor 22 is mounted to the base 14 of the stepper motor stage 12. The stepper motor 22 is attached to a lead screw 24 for driving the lead screw 24 in a rotary fashion. The lead screw 24 extends through a hole 26 in the base 14 and through a hole 28 in an end portion of slide stage 16. The lead screw also passes through the roller nut assembly 10 and holes 30, 32 of slide stage 16. An end portion 34 of lead screw 24 is supported by a bearing 36 which is supported in a bore 38 in the base 14 of the stepper motor stage 12o The stepper motor 22 is secured to the base 14 by a plurality of screws 40.

The slide stage 16 is provided with a roller nut chamber 42 for receiving the roller nut assembly 10. The roller nut assembly 10 is secured in the roller nut chamber 42 by a mounting bracket 44. The slide stage 16 is provided with a mounting pocket 46 for receiving the mounting bracket 44 such that the top surface of the mounting bracket 44 is flush with the top surface of the slide stage 16.

In operation, the stepper motor 22 is driven so as to drive the lead screw 24 in a rotary fashion. As the leadscrew 24 rotates, the roller nut assembly 10, which engages the lead screw 24 in a manner which will be described later, is driven in a linear fashion. Because the roller nut assembly 10 is secured to the slide stage 16, the roller nut assembly 10 drives the slide stage 16 in a linear fashion relative to the base 14 of the stepper motor stage 12.

With reference to FIGS. 2 and 3, the roller nut assembly 10 according to the present invention will now be described in greater detail. The roller nut assembly 10 includes a housing 50 having two open ends 52, 54 for receiving the lead screw 24 therethrough. It should be understood that the shape and configuration of the housing 50 is merely exemplary and may be varied in many ways.

The roller nut assembly 10 includes first and second bearings 56, 58, respectively. The first and second bearings 56, 58 are angularly disposed within the housing 50. Each of the first and second bearings 56f 58 include an inner race 60 and an outer race 62. A plurality of balls 64 are provided between the inner and outer races 60, 62.

The inner race 60 of each of the first and second bearings 56, 58 are provided with an inner diameter or flank engaging portion 66. According to the embodiment shown in FIG. 3, the flank engaging portion 66 is a 90° angle on a first radially inner diameter of the inner race 60 of each of the first and second bearings 56, 58.

The flank engaging portion 66 of the inner race 60 of the first bearing 56 engages the leading flank 68 of the helical thread 70 of lead screw 24. The flank engaging portion 66 of the inner race 60 of the second bearing 58 engages the following flank 72 of the helical thread 70 of the lead screw 24.

Each of the inner races 60 of the first and second bearings 56, 58 also include a crest contacting portion 74 which engage the crest 76 of the helical thread 70 of the lead screw 24, as best seen in FIG. 3. The crest contacting portion 74 of the first and second bearings 56, 58 includes a beveled edge which is designed to provide a smooth rotating contact with the crest 76 of the helical thread 70 of the lead screw The first and second bearings 56, 58 are angularly supported within the housing 50 of the roller nut assembly 10 so that the flank engaging portion 66 of the inner races 60 are substantially parallel with the leading and following flank surfaces 68, 72, respectively of the helical thread 70. With reference to FIG. 4, the angles α1, α2 of the leading and following flanks 68, 70, respectively are shown. Thus, the first bearing 56 which engages the leading flank 68 of the helical thread 70 is preferably disposed at approximately an angle 1 relative to the lead screw 24. Likewise, the second bearing 58, which has a flank engaging portion 66 engaging the following flank 72 of helical thread 70, is disposed at approximately an angle 2 relative to the lead screw 24. In other words, the first and second bearings 56, 58, are disposed to accommodate the thread 70 of the lead screw 24 by being tilted in accordance with the tracking angle of the thread 70 of the lead screw 24 as well as the helix angle thereof. As used herein, the tracking angle of the thread 70 of the lead screw 24 is the angle of each of the leading and following flanks 68, 72 with respect to the axis of rotation 77 of lead screw 24. The helix angle is that angle at which the thread 70 is transverse to the axis of the rotation 77 of lead screw 24.

The first bearing 56 is supported within the housing 50 by the lead screw 24 and a bearing support pin 78 which is mounted in holes 80, 82 of housing 50 and generally supports the outer race 62 of the first bearing 56. The outer race 62 of the first bearing 56 has a housing engaging portion 84 which engages an inner surface of the housing 50 for providing additional lateral support to the first bearing 56.

The second bearing 58 is supported within the housing 50 by the lead screw 24 and a bearing support pin 86 which is received in mounting hole 88 and an additional mounting hole, not shown, of housing 50 and generally supports the outer race 62 of the second bearing 58. The outer race 62 of the second bearing 58 has a housing engaging portion 84 which engages an inner surface of the housing 50 and provides lateral support to the second bearing 58.

A leaf spring 94 is provided between the bearings 56, 58 for preloading each of the bearings 56, 58. The leaf spring 94 is held in place by spring retaining pins 96 which are received in a plurality of support holes 98 of housing 50. The leaf spring 94 biases the first and second bearings 56, 58 in opposing directions so that the bearings 56, 58 are preloaded and self-align themselves with the thread angle of the lead screw and are thus adaptable to virtually any standard threaded rod or spindle by design. The support pins 78, 86 and retaining pins 96 are merely an exemplary means of supporting the bearings 56, 58 and leaf spring 94. It should be understood that the specific method of supporting the bearings 56, 58 and leaf spring 94 within the housing 50 can be varied in many ways.

The present roller nut assembly 10 is advantageous in that the point of engagement of the lead screw 24 and the inner race 60 of the bearings 56, 58 is only a rolling contact. Therefore, the wear between the lead screw 24 and the bearings 56, 58 is minimal. Further, friction is higher at the contact of the flank engaging portion 66 of the inner race 60 and the helical thread 70 of the lead screw 24, than between the inner race 60 and the outer race 62 of the bearings 56, 58. Therefore, the efficiency of the linear displacement device 1 according to the present invention is greatly increased as compared to conventional linear displacement devices.

The lead screw 24 drives the inner races 60, while the inner races track the thread profile of the lead screw 24 which in turn moves the housing 50 in a linear direction. The bearings 56, 58 are loaded against the thread 70 or flanks 68, 72 of the lead screw 24 and against each other by leaf spring 94. All the pre-load forces and additional axial loads are confined to the races of the bearings 56, 58.

The pre-load forces on the bearings 56, 58 remove the play between the roller nut assembly 10 and the lead screw 24. Further, lubrication of the roller nut assembly 10 can be confined to the ball bearings only and, depending upon the speed for which the assembly is utilized, may not be necessary at all. Because of the reduced friction obtained by the bearings 56, 58 the efficiency of this type of drive is typically increased to greater than 95%, versus 20–50% in conventional nut-type linear displacement devices.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A linear displacement device, comprising:
   a lead screw having a helical thread, said helical thread having a leading flank portion, a following flank portion, and a crest portion; and
   a roller nut assembly including:
      a housing;
      first and second bearings each having an inner race, an outer race and a plurality of balls disposed between said inner and outer races, said first and second bearings being supported by said housing; and
      spring means for preloading said first and second bearings;
      wherein the inner races of each of said first and second bearings have a flank engaging portion for engaging one of said flanks of said helical thread of said lead screw and wherein each of said first and second bearings have a crest engaging portion for engaging said crest of said helical thread of said lead screw.

2. The linear displacement device according to claim 1, wherein said spring means includes a leaf spring disposed between said first and second bearings.

3. The linear displacement device according to claim 2, wherein said leaf spring is retained between said first and second bearings by a plurality of pins mounted to said housing.

4. The linear displacement device according to claim 1, wherein said housing is provided with support members for supporting said first and second bearings in said housing.

5. The linear displacement device according to claim 1, wherein said first bearing is angularly supported in said housing such that an angle of a central axis of said first bearing relative to a central axis of said lead screw is approximately equal to an angle of a leading flank surface of said helical thread relative to a plane perpendicular to said central axis of said lead screw.

6. The linear displacement device according to claim 5, wherein said second bearing is angularly supported within said housing such that an angle of a central axis of said second bearing is approximately equal to an angle of a following flank surface of said helical thread relative to a plane perpendicular to said central axis of said lead screw.

7. The linear displacement device according to claim 1, wherein said housing is provided with openings for receiving said lead screw therethrough.

8. A roller nut assembly for use on a lead screw, comprising:

a housing;

first and second bearings each having an inner race, an outer race and a plurality of balls disposed between said inner and outer races, said first and second bearings being angularly supported within said housing; and spring means for preloading said first and second bearings;

wherein the inner races of said first and second bearings have a flank engaging portion for engaging a flank of a helical thread of said lead screw and wherein the inner races of said first and second bearings have a crest engaging portion for engaging a crest of said helical thread of said lead screw.

9. The roller nut assembly according to claim 8, wherein said spring means includes a leaf spring retained between said first and second bearings.

10. The roller nut assembly according to claim 9, wherein said leaf spring is supported by a plurality of pins mounted to said housing.

11. The roller nut assembly according to claim 8, wherein said housing is provided with support members for supporting said first and second bearings.

12. The roller nut assembly according to claim 8, wherein said housing includes a first and second opening for receiving said lead screw therethrough.

13. A linear displacement device, comprising:

a lead screw having a helical thread, said helical thread having a leading flank portion, a following flank portion, and a crest portion; and a roller nut assembly including:

a housing;

first and second bearings each having an inner race, an outer race and a plurality of balls disposed between said inner and outer races, said first and second bearings being supported by said housing; and a leaf spring disposed between said first and second bearings, said leaf spring biasing said first and second bearings in opposing directions such that said first and second bearings are preloaded;

wherein the inner races of each of said first and second bearings have a flank engaging portion for engaging one of said flanks of said helical thread of said lead screw.

14. The linear displacement device according to claim 13, wherein each of said first and second bearings have a crest engaging portion for engaging said crest of said helical thread of said lead screw.

15. The linear displacement device according to claim 13, wherein said leaf spring is retained between said first and second bearings by a plurality of pins mounted to said housing.

16. The linear displacement device according to claim 13, wherein said housing is provided with support members for supporting said first and second bearings in said housing.

17. The linear displacement device according to claim 13, wherein said first bearing is angularly supported in said housing such that an angle of a central axis of said first bearing relative to a central axis of said lead screw is approximately equal to an angle of a leading flank surface of said helical thread relative to a plane perpendicular to said central axis of said lead screw.

18. The linear displacement device according to claim 13, wherein said second bearing is angularly supported within said housing such that an angle of a central axis of said second bearing is approximately equal to an angle of a following flank surface of said helical thread relative to a plane perpendicular to said central axis of said lead screw.

* * * * *